US008656096B2

(12) United States Patent
Acedo et al.

(10) Patent No.: US 8,656,096 B2
(45) Date of Patent: *Feb. 18, 2014

(54) ON DEMAND CONVERSION OF STANDARD LOGICAL VOLUMES TO THIN-PROVISIONED LOGICAL VOLUMES

(75) Inventors: Mario Francisco Acedo, Tucson, AZ (US); Paul Anthony Jennas, II, Tucson, AZ (US); Jason Lee Peipelman, Vail, AZ (US); Richard Anthony Ripberger, Tucson, AZ (US); Matthew John Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.
This patent is subject to a terminal disclaimer.

(21) Appl. No.: 13/447,890

(22) Filed: Apr. 16, 2012

(65) Prior Publication Data
US 2012/0203998 A1    Aug. 9, 2012

Related U.S. Application Data

(63) Continuation of application No. 12/698,614, filed on Feb. 2, 2010.

(51) Int. Cl.
*G06F 12/08* (2006.01)

(52) U.S. Cl.
USPC ............... 711/112; 711/202; 711/E12.016

(58) Field of Classification Search
USPC .................................. 711/165, 170
See application file for complete search history.

(56) References Cited

U.S. PATENT DOCUMENTS

| 7,162,600 | B2 | 1/2007 | Kano et al. |
| 7,222,176 | B1 | 5/2007 | Laurent et al. |
| 7,467,276 | B1 | 12/2008 | Kahn et al. |
| 2005/0044310 | A1 | 2/2005 | Cameron |
| 2006/0224843 | A1 | 10/2006 | Rao et al. |
| 2007/0255921 | A1* | 11/2007 | Gole et al. ............ 711/170 |
| 2009/0089534 | A1* | 4/2009 | Zohar et al. ............ 711/173 |
| 2009/0300023 | A1* | 12/2009 | Vaghani ............ 707/10 |

OTHER PUBLICATIONS

Meyer, et al., "Parallax: Virtual Disks for Virtual Machines," European Conference on Computer Systems, Proceedings of the 3rd ACM SIGOPS/EuroSys European Conference on Computer Systems 2008, Glasgow, Scotland, UK, pp. 41-54, 2008.
Ripberger, et al., "IBM System Storage DS8000 Storage Virtualization Overview," IBM Corporation, Version 2.0, Apr. 13, 2010, last accessed at http://www-03.ibm.com/support/techdocs/atsmastr.nsf/5cb5ed706d254a8186256c71006d2e0a/b16b8f8dcb4a21028625763a0081b712/$FILE/DS8000%20Storage%20Virtualization%20Overview%20V2.0.pdf.
PCT International Search Report and Written Opinion, International Application No. PCT/EP2011/051277, May 13, 2011.

* cited by examiner

*Primary Examiner* — Kenneth Lo
(74) *Attorney, Agent, or Firm* — Nelson and Nelson; Daniel P. Nelson; Alexis V. Nelson (57) ABSTRACT

A method for concurrently converting a standard volume to a thin-provisioned volume includes initially establishing metadata for a thin-provisioned volume. The method then updates the metadata for the thin-provisioned volume to point to extents residing in a standard volume. The method then suspends I/O to metadata for the standard volume. Upon suspending the I/O, the method migrates control of the extents in the standard volume from a standard-volume control algorithm to a thin-provisioned-volume control algorithm. The method then resumes the I/O to the metadata for the thin-provisioned volume. Using this technique, standard volumes may be rapidly converted to thin-provisioned volumes while minimally disrupting I/O to the volumes. A corresponding apparatus and computer program product are also disclosed and claimed herein.

6 Claims, 7 Drawing Sheets

ON DEMAND CONVERSION OF STANDARD LOGICAL VOLUMES TO THIN-PROVISIONED LOGICAL VOLUMES

BACKGROUND

1. Field of the Invention

This invention relates to apparatus and methods for efficiently storing data, and more particularly to apparatus and methods for concurrently converting standard logical volumes to thin-provisioned logical volumes.

2. Background of the Invention

Customer growth over time varies and is often difficult to predict. As a result, it is often difficult to design and allocate storage resources that will adequately accommodate customer growth over a period of time while still ensuring that the storage resources are used in an efficient manner. Allocated but unused storage space increases up front costs, hardware, and power consumption. Thus, there is a powerful incentive to ensure that storage resources are allocated in an efficient manner. This involves a careful balancing act to ensure that enough storage space is available to accommodate growth while not allocating too much storage space that unnecessarily increases costs.

One current solution to the above-stated problem is to implement thin provisioning. Thin provisioning allows storage space to be allocated on a just-enough and just-in-time basis as data is written. This differs from conventional storage allocation techniques (also called "fat provisioning") which allocates storage space up front and often results in large amounts of unused storage space. Thin provisioning, by comparison, eliminates most of the free space in storage volumes and helps to avoid poor storage utilization rates, often as low as ten percent, that occur using traditional "fat provisioning" allocation techniques. When properly implemented, thin provisioning can significantly reduce the amount of time system administrators spend allocating and managing storage.

Although thin provisioning may be used to more efficiently utilize storage capacity, there is currently no method to concurrently convert traditional storage volumes (storage volumes using "fat provisioning" techniques) to more efficient thin-provisioned volumes. Current techniques for performing fat to thin conversions may involve performing block-by-block copies from a standard fat volume to a new thin-provisioned volume. Other approaches include backing up the standard fat volume at a file level, and then restoring the files to a new thin volume. Although effective, these approaches can be time-consuming and disrupt I/O to the volumes.

In view of the foregoing, what are needed are apparatus and methods to concurrently convert standard logical volumes to more efficient thin-provisioned volumes. Such an apparatus and method would ideally perform the conversion rapidly without significantly disrupting I/O to the volume.

SUMMARY

The invention has been developed in response to the present state of the art and, in particular, in response to the problems and needs in the art that have not yet been fully solved by currently available apparatus and methods. Accordingly, the invention has been developed to provide apparatus and methods for concurrently converting standard "fat" volumes to more efficient thin-provisioned volumes. The features and advantages of the invention will become more fully apparent from the following description and appended claims, or may be learned by practice of the invention as set forth hereinafter.

Consistent with the foregoing, a method for concurrently converting a standard volume to a thin-provisioned volume is disclosed herein. In certain embodiments, such a method includes initially establishing metadata for a thin-provisioned volume. The method then updates the metadata for the thin-provisioned volume to point to extents residing in a standard volume. The method then suspends I/O to metadata for the standard volume. Upon suspending the I/O, the method migrates control of the extents in the standard volume from a standard-volume control algorithm to a thin-provisioned-volume control algorithm. The method then resumes the I/O to the metadata for the thin-provisioned volume. Using this technique, standard volumes may be rapidly converted to thin-provisioned volumes while minimally disrupting I/O to the volumes.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable medium embodied in any tangible medium of expression having computer-usable program code stored therein.

Any combination of one or more computer-usable or computer-readable medium(s) may be utilized to store the computer program product. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
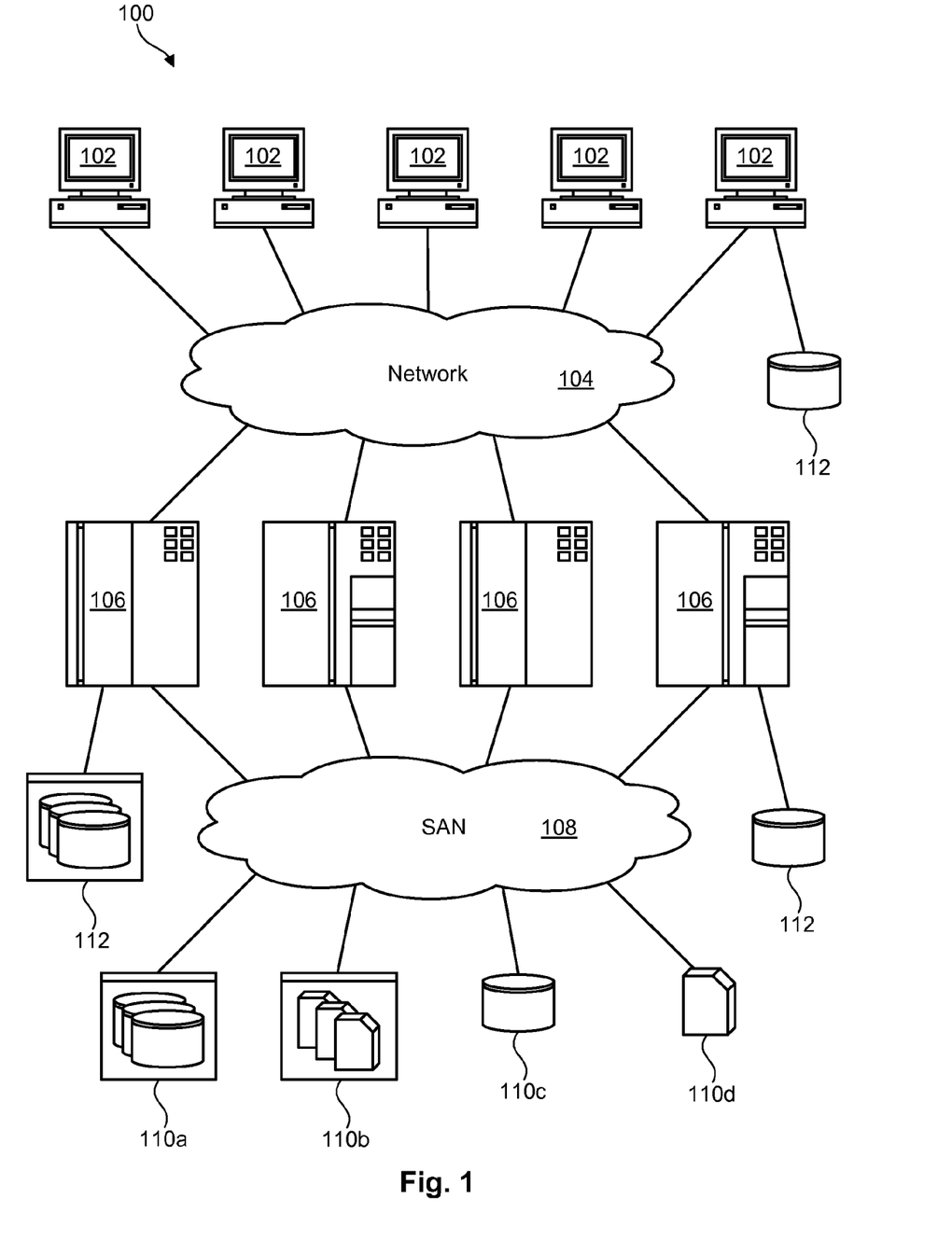
FIG. 1 is a high-level block diagram showing one example of a network architecture in which an apparatus and method in accordance with the invention may be implemented.

Referring to FIG. 1, one example of a network architecture 100 is illustrated. The network architecture 100 is presented to show one example of an environment where an apparatus and method in accordance with the invention may be implemented. The network architecture 100 is presented only by way of example and is not intended to be limiting. Indeed, the apparatus and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the apparatus and methods described herein to convert standard fat volumes to more efficient thin-provisioned volumes.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. Where the network 108 is a SAN, the servers 106 and storage systems 110 may communicate using a networking standard such as Fibre Channel (FC). One or more of the storage systems 110 may utilize the apparatus and methods described herein to convert standard fat volumes to more efficient thin-provisioned volumes.

Figure 2:
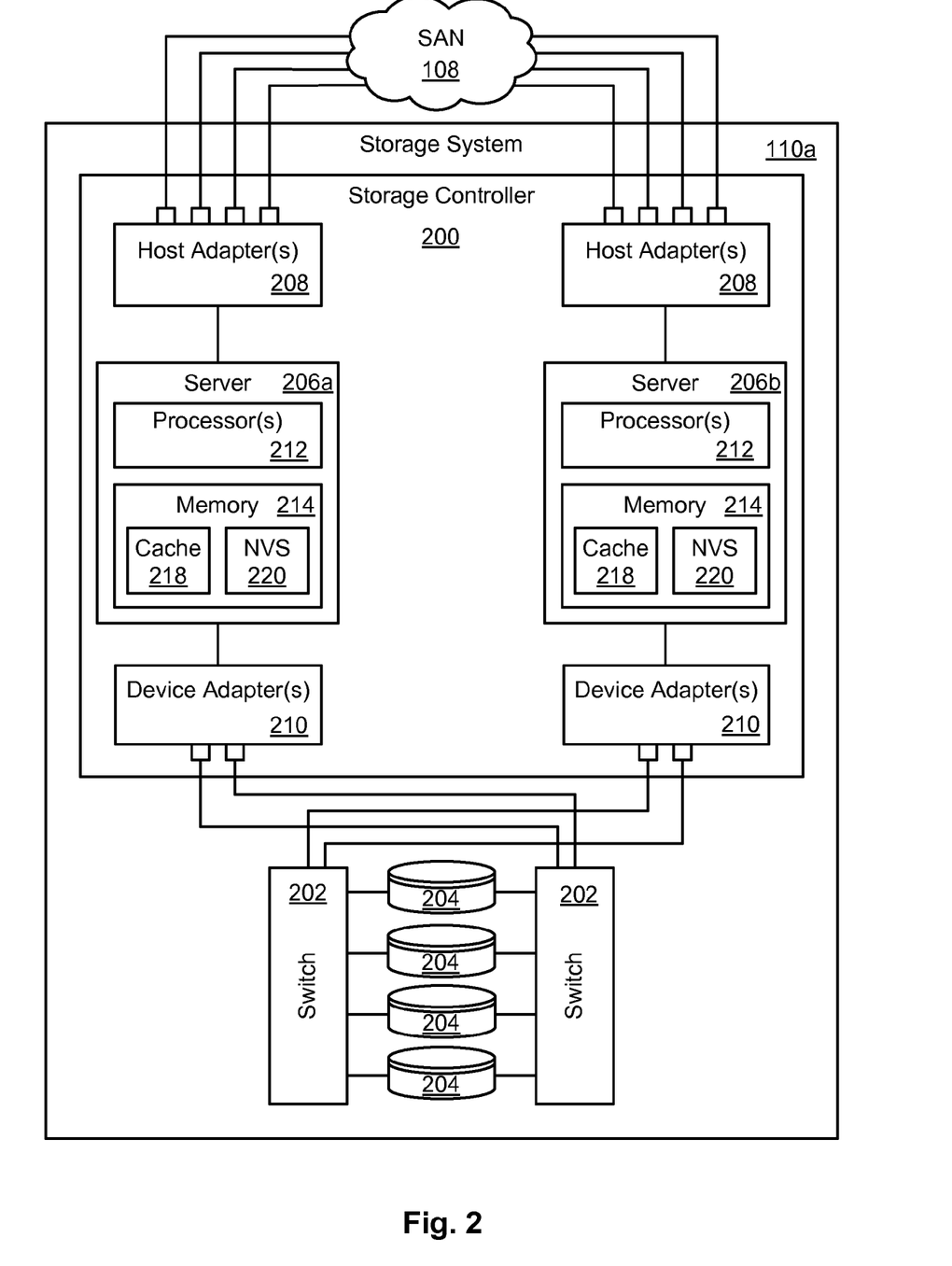
FIG. 2 is a high-level block diagram showing one example of a storage system in which various modules in accordance with the invention may be implemented.

Referring to FIG. 2, one embodiment of a storage system 110a containing an array of storage devices 204 (e.g., hard-disk drives 204 and/or solid-state drives 204) is illustrated. The internal components of the storage system 110a are shown since the apparatus and methods disclosed herein may, in certain embodiments, be implemented within such a storage system 110a, although the apparatus and methods may also be implemented within other storage systems 110, 112. As shown, the storage system 110a includes a storage controller 200, one or more switches 202, and one or more storage devices 204, such as hard-disk drives 204 or solid-state drives 204 (e.g., flash-memory-based drives 204). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the data migration methodology disclosed herein is not limited to the IBM DS8000™ enterprise storage system 110a, but may be implemented in any comparable or analogous storage system 110, regardless of the manufacturer, product name, or components or component names associated with the storage system 110. Any storage system 110 that could benefit from one or more embodiments of the invention is deemed to fall within the scope of the invention. Thus, the IBM DS8000™ is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

In selected embodiments, the memory 214 includes a cache 218. Whenever a host 106 performs a read operation, the server 206 that performs the read may fetch data from the storages devices 204 and save it in its cache 218 in the event it is required again. If the data is requested again by a host 106, the server 206 may fetch the data from the cache 218 instead of fetching it from the storage devices 204, saving both time and resources. Similarly, when a host 106 performs a write, the server 106 that receives the write request may store the write in its cache 218 and destage the write to the storage devices 204 at a later time. When a write is stored in cache 218, the write may also be stored in non-volatile storage (NVS) 220 of the opposite server 206 so that the write can be recovered by the opposite server 206 in the event the first server 206 fails.

Figure 3:
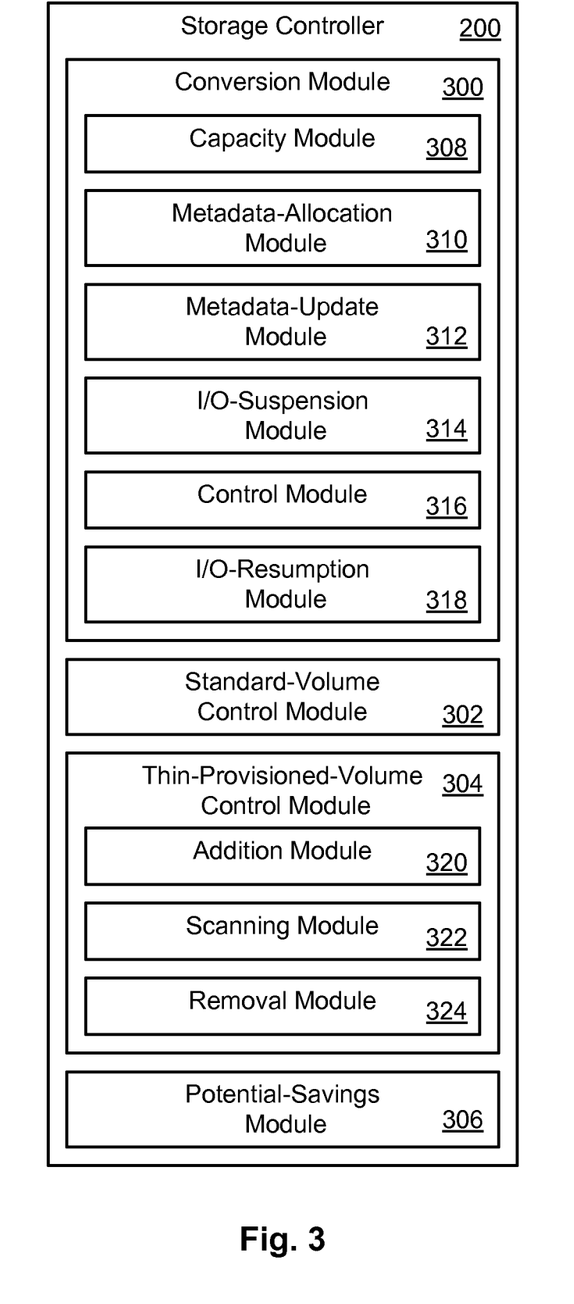
FIG. 3 is a high-level block diagram showing various modules that may be used to implement an apparatus and method in accordance with the invention.

Referring to FIG. 3, apparatus and methods in accordance with the invention may be implemented as one or more modules. These modules may be implemented in hardware, software or firmware executable on hardware, or a combination thereof. These modules are presented only by way of example and are not intended to be limiting. Indeed, alternative embodiments may include more or fewer modules than those illustrated. Furthermore, it should be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, some functionality shown in the storage controller 200 may actually be implemented in a host system 106 and vice versa. Other functionality shown only in the storage controller 200 may actually be distributed across the storage controller 200 and a host system 106. Thus, the location of the modules is presented only by way of example and is not intended to be limiting.

As shown in FIG. 3, in selected embodiments, a storage controller 200 may include one or more of a conversion module 300, a standard-volume control module 302, a thin-provisioned-volume control module 304, and a potential-savings module 306. In general, a conversion module 300 may include functionality to convert standard fat volumes to more efficient thin-provisioned volumes. A standard-volume control module 302 may manage I/O to standard logical volumes. A thin-provisioned-volume control module 304, on the other hand, may manage I/O to thin-provisioned logical volumes. A potential-savings module 306 may, in certain embodiments, calculate the amount of free capacity that may be generated as a result of converting one or more standard volumes to one or more thin-provisioned volumes.

As shown in FIG. 3, a conversion module 300 may, in certain embodiments, include one or more of a capacity module 308, a metadata-allocation module 310, a metadata-update module 312, an I/O-suspension module 314, a control module 316, and an I/O resumption module 318. A capacity module 308 may be used to ensure that sufficient storage space is available in the storage system 110a to accommodate metadata for new thin-provisioned volumes. Metadata for thin-provisioned volumes is typically larger than metadata for standard logical volumes and thus occupies more storage space. If sufficient space is not available, the capacity module 308 may automatically allocate additional storage space to accommodate the new metadata. Once sufficient storage space is available, a metadata-allocation module 310 may establish metadata for new thin-provisioned volumes in the allocated storage space.

Once metadata for a thin-provisioned volume has been established, a metadata-update module 312 may update the metadata to point to extents residing in the old standard volume. This will effectively bring these extents into the thin-provisioned volume. In selected embodiments, the metadata-update module 312 will update the metadata to point to all extents (including zeroed and non-zeroed extents) residing in the old standard volume. The zeroed extents may then be marked as free and removed from the thin-provisioned volume at a later time (using the scanning module 322), as will be explained in more detail hereafter. In other embodiments, the metadata-update module 312 will update the metadata to include only non-zeroed extents (i.e., extents that contain data) residing in the old standard volume. The remaining zeroed extents (i.e., extents that a host 106 has not been previously written to or to which the host 106 has written all zeros) may be freed and placed in a free extent pool where they may be allocated to thin-provisioned volumes on an as-needed basis. In this embodiment, the new thin-provisioned volume will contain less free space at the time it is created.

Once the metadata for the thin-provisioned volume has been updated, an I/O suspension module 314 may suspend I/O to the metadata for the standard volume and optionally the metadata for the new thin-provisioned volume (although I/O to the thin-provisioned metadata should not be occurring at this stage in the process). This will ensure that no changes are made to the metadata as control of the volume is passed from a standard-volume control algorithm to a thin-provisioning control algorithm. While the I/O is suspended, a control module 316 may pass control of the volume from a standard-volume control module 302 to a thin-provisioned-volume control module 304. As previously mentioned, the thin-provisioned-volume control module 304 may manage I/O to the newly created thin-provisioned volume. As control is passed, the metadata for the new thin-provisioned volume assumes the volume number (or LUN ID) of the original standard volume. Once control is passed, an I/O-resumption module 318 may resume I/O to the volume's metadata, except that now changes will be directed to the metadata for the thin-provisioned volume instead of the metadata for the standard volume. At this point, any reads or writes to the volume will use the metadata for the thin-provisioned volume instead of the metadata for the standard volume to locate the volume's extents on the storage system 110a.

In certain embodiments, the thin-provisioned-volume control module 304 includes one or more of an addition module 320, a scanning module 322, and a removal module 324. An addition module 320 may be configured to add storage space to a thin-provisioned volume when the space is needed. More specifically, the addition module 320 may add extents to the thin-provisioned volume from a free extent pool as additional space is needed in response to writes to the volume. This may be performed on a just-enough and just-in-time basis, as previously mentioned.

A scanning module 322 may be used to scan a thin-provisioned volume for free space that can be removed to the free extent pool. For example, the scanning module 322 may scan for extents that are zeroed (contain all zeros) and a removal module 324 may remove these extents to the free extent pool. In certain embodiments, the scanning module 322 may continuously scan thin-provisioned volumes to look for extents that can be reclaimed, although this may negatively impact performance. In other embodiments, the scanning module 322 may periodically scan the thin-provisioned volumes and/or scan the thin-provisioned volumes at the time they are created. In yet other embodiments, the scanning module 322 may be manually invoked by a user.

In certain embodiments, when a free extent is detected, the removal module 324 may automatically remove the extent from the thin-provisioned volume to a free extent pool. In other embodiments, when a free extent is detected, an email or other notification may be sent to a user and the user may then invoke the removal module 324 to remove the free extent.

In selected embodiments, a potential-savings module 306 may be provided to calculate and/or display the amount of free capacity that may be generated as a result of converting one or more standard volumes to one or more thin-provisioned volumes. In certain embodiments, a system administrator may manually invoke the potential-savings module 306 to determine how much storage space can be reclaimed. In other embodiments, the storage controller 200 may invoke the potential-savings module 306 and send an email or other communication containing the results to a system administrator so that he or she can take action. In selected embodiments, the potential-savings module 306 may identify specific standard volumes that contain the most unused space and would allow the most storage space to be reclaimed if they were converted to thin-provisioned volumes.

One notable characteristic of the apparatus and methods described herein is that, unlike conventional fat-to-thin conversion techniques, the apparatus and methods do not physically move or transfer data in a volume when converting a standard volume to a thin-provisioned volume. The apparatus and methods simply reconfigure the metadata for the volume from standard metadata to thin-provision metadata, and pass control to a thin-provision control algorithm. This method for converting standard volumes provides a faster conversion process and allows the conversion to be performed concurrently (in an "on demand" manner while I/O is still occurring to the data). The I/O is able to continue at least in part because the underlying data of the volume does not actually move during the conversion process.

Figure 4:
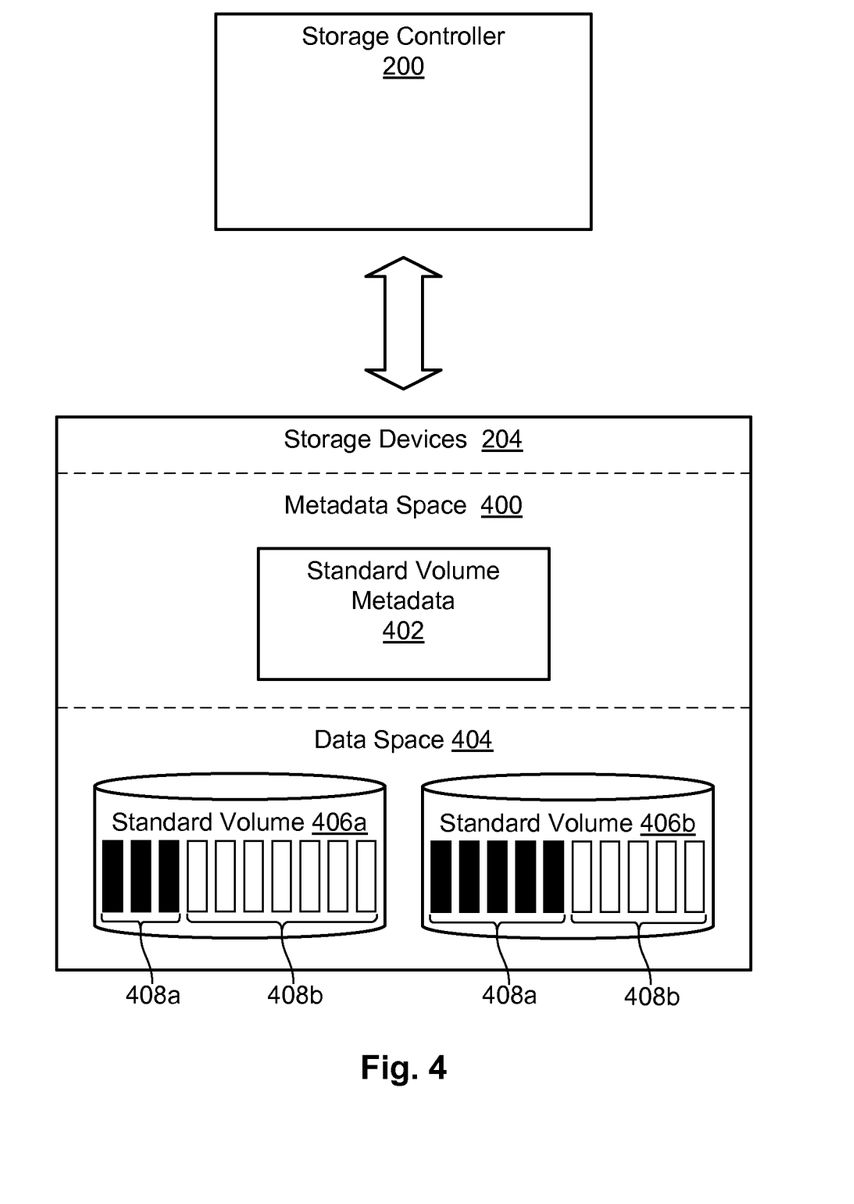
FIG. 4 is a high-level block diagram showing several standard "fat" volumes prior to conversion.
Figure 5:
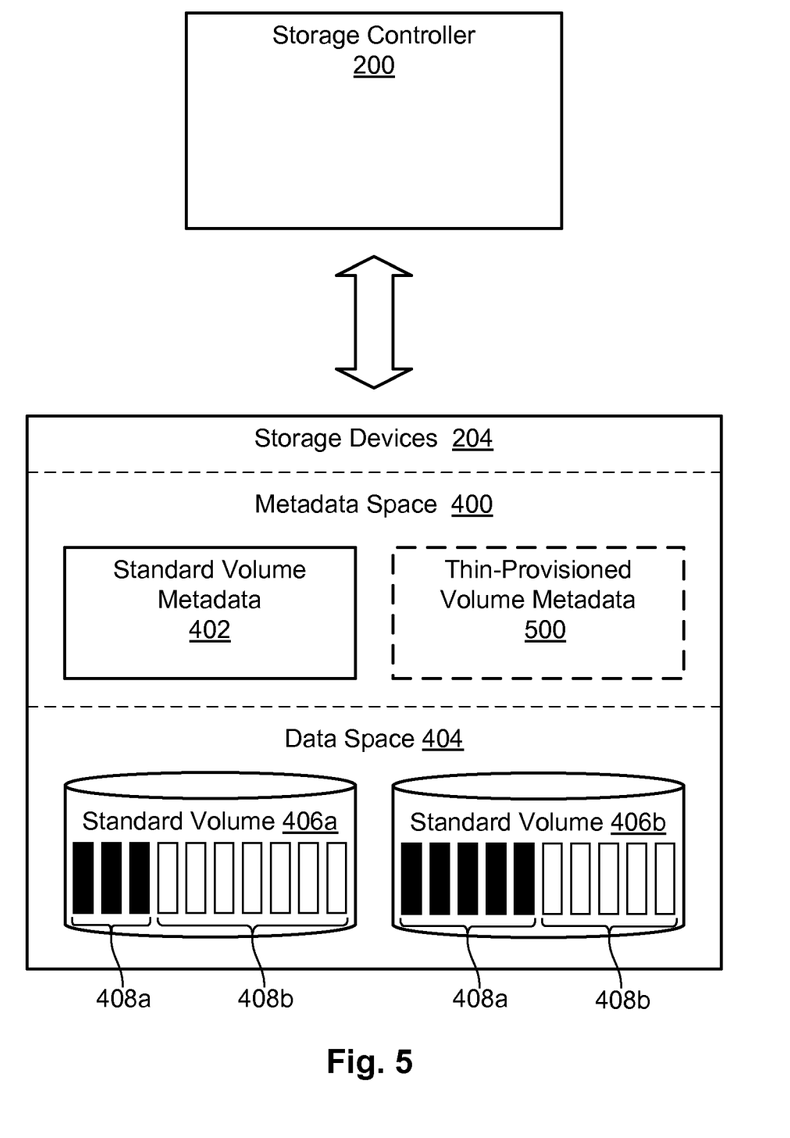
FIG. 5 is a high-level block diagram showing the creation of metadata for new thin-provisioned volumes.
Figure 6:
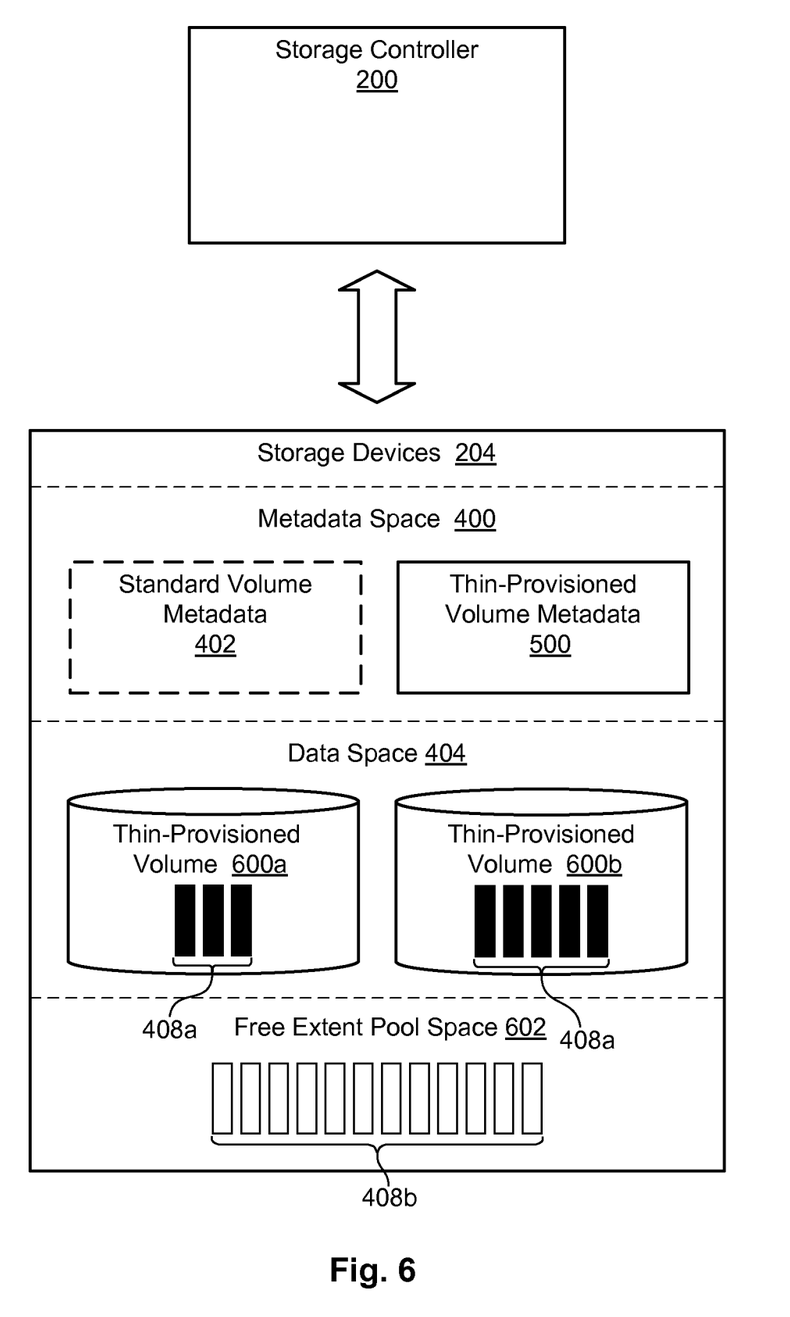
FIG. 6 is a high-level block diagram showing the final conversion of the standard volumes to thin-provisioned volumes.

Referring to FIGS. 4 through 6, a specific example is provided to illustrate the operation of the modules described above. As shown in FIG. 4, one or more storage devices 204 (e.g., disk drives, solid-state drives, etc.) may store one or more standard volumes 406a, 406b residing in data space 404 of the storage devices 204. These standard volumes 406a, 406b may include one or more extents 408a, 408b. For the purposes of this disclosure, the term "extent" is used to refer to a block or section of storage space in the storage devices 204 that is used to store data. In certain embodiments, the extents 408a, 408b are substantially uniform in size (e.g., 1 GB blocks) although this is not mandatory. In certain embodiments, the size of the extents 408a, 408b is arbitrary and may be adjusted as needed.

For the purposes of this disclosure, shaded extents 408a signify that the extents 408a contain data. The un-shaded extents 408b, on the other hand, signify that the extents 408b do not contain data (i.e., contain all zeros). Thus, the un-shaded extents 408b represent storage space that may potentially be reclaimed from the standard volumes 406a, 406b if and when they are converted to thin-provisioned volumes. As further shown in FIG. 4, the standard volumes 406a, 406b may include standard volume metadata 402 residing in metadata space 400 of the storage devices 204. This metadata 402 may initially point to the extents 408a, 408b to indicate that the extents reside in the standard volumes 406a, 406b.

Referring to FIG. 5, in order to convert the standard volumes 406a, 406b to thin-provisioned volumes, the storage controller 200 may initially ensure that sufficient storage space 400 is available to accommodate metadata 500 for new thin-provisioned volumes. If sufficient storage space 400 is not available, the storage controller 200 may allocate additional storage space 400 to accommodate the new metadata 500. Once sufficient space 400 is available, the storage controller 200 may establish metadata 500 for the new thin-provisioned volumes.

Referring to FIG. 6, once metadata 500 for the thin-provisioned volumes has been established, the storage controller 200 may update the metadata 500 to point to the extents residing in the old standard volumes 406a, 406b. This will bring the extents into the new thin-provisioned volumes 600a, 600b. As previously mentioned, in selected embodiments, the metadata 500 may be updated to point to all extents 408a, 408b (including zeroed and non-zeroed extents) residing in the old standard volumes 406a, 406b. The zeroed extents 408b may then be removed from the thin-provisioned volumes 600a, 600b to a free extent pool 602 at a later time. In other embodiments, the metadata 500 may be initially updated to include only non-zeroed extents 408a (i.e., extents that contain data). The remaining zeroed extents 408b may be freed and placed in the free extent pool 602 where they may be allocated to volumes on an as-needed basis.

As previously mentioned, once the metadata 500 for the thin-provisioned volumes has been updated, I/O may be suspended to the metadata 402 for the standard volumes. This will ensure that no changes are made to the metadata 402 as control of the volume is passed from a standard-volume control algorithm to a thin-provision control algorithm. The storage controller 200 may then pass control of the volumes from the standard-volume control algorithm to a thin-provision control algorithm. As control is passed, the metadata 500 for the new thin-provisioned volumes 600a, 600b assumes the volume numbers (or LUN IDs) of the original standard volumes 406a, 406b. Once control is passed, I/O may resume to the metadata 500 of the thin-provisioned volumes 600a, 600b. This will complete the process of converting the standard volumes 406a, 406b to thin-provisioned volumes 600a, 600b. At this point, any reads or writes to the thin-provisioned volumes 600a, 600b will use the metadata 500 for the thin-provisioned volumes to locate extents 408a in the volumes 600a, 600b.

Figure 7:
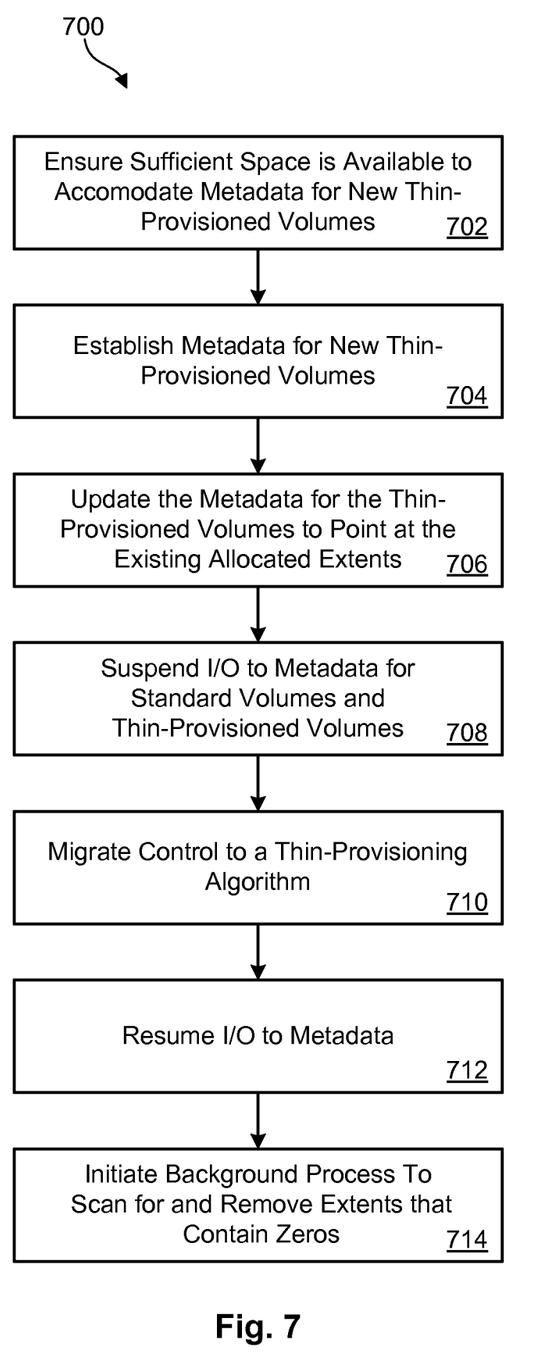
FIG. 7 is a flow diagram showing one embodiment of a method for concurrently converting standard volumes to more efficient thin-provisioned volumes.

Referring to FIG. 7, a method 700 for concurrently converting standard volumes to more efficient thin-provisioned volumes is illustrated. This method 700 roughly corresponds to the techniques discussed in association with FIGS. 4 through 6. As shown, the method 700 initially ensures 702 that sufficient space is available to accommodate metadata for one or more new thin-provisioned volumes. The method 700 then establishes 704 metadata for the new thin-provisioned volumes in this storage space. Once the metadata is established 704, the method 700 updates the metadata for the thin-provisioned volumes to point to the existing allocated extents (either all extents or all non-zeroed extents) in the standard volumes being converted.

The method 700 may then suspend 708 I/O to the metadata for the standard volumes and optionally the metadata for the thin-provisioned volumes. This step 708 may include suspending all destages from the cache 218 to the metadata for the standard volumes and the metadata for the thin-provisioned volumes. Once the I/O is suspended, the method 700 migrates 710 control of the volumes to a thin-provision algorithm. The method 700 then resumes 712 I/O to the metadata. This step 712 may include resuming destages from the cache 218 to the metadata for the thin-provisioned volumes. The method 700 may then initiate 714 background processes to scan for free extents in the thin-provisioned volumes and remove these extents to a free extent pool The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for concurrently converting a standard volume to a thin-provisioned volume without physically moving or migrating data in the standard volume, the method comprising:
creating, on storage devices hosting a standard volume, metadata for a thin-provisioned volume;
updating the metadata for the thin-provisioned volume to point to extents residing in the standard volume;
suspending I/O to metadata for the standard volume;
migrating control of the extents from a standard-volume control algorithm to a thin-provisioned-volume control algorithm;
resuming the I/O to the metadata for the thin-provisioned volume;
scanning the thin-provisioned volume for any extents that contain all zeroes (hereinafter "zeroed extents"); and
removing the zeroed extents from the thin-provisioned volume.

2. The method of claim 1, wherein updating the metadata for the thin-provisioned volume comprises updating the metadata to point to all extents residing in the standard volume.

3. The method of claim 1, wherein removing the zeroed extents comprises placing the zeroed extents in a free extent pool.

4. The method of claim 1, wherein removing the zeroed extents comprises one of automatically removing the zeroed extents and removing the zeroed extents in response to user input.

5. The method of claim 1, wherein updating the metadata for the thin-provisioned volume comprises updating the metadata to point to all non-zeroed extents residing in the standard volume.

6. The method of claim 1, further comprising ensuring that sufficient space is available to accommodate the metadata for the thin-provisioned volume prior to creating the metadata for the thin-provisioned volume.

* * * * *